US00RE44020E

(19) United States
(12) Reissued Patent
Melero

(10) Patent Number: US RE44,020 E
(45) Date of Reissued Patent: Feb. 19, 2013

(54) REPORTING COMMUNICATION LINK INFORMATION

(75) Inventor: Juan Melero, Malaga (ES)

(73) Assignee: Intellectual Ventures I LLC, Wilmington, DE (US)

(21) Appl. No.: 12/619,509

(22) Filed: Nov. 16, 2009

Related U.S. Patent Documents

Reissue of:
(64) Patent No.: 6,978,120
Issued: Dec. 20, 2005
Appl. No.: 10/088,238
PCT Filed: Sep. 5, 2000
PCT No.: PCT/IB00/01316
§ 371 (c)(1),
(2), (4) Date: Aug. 27, 2002
PCT Pub. No.: WO01/22765
PCT Pub. Date: Mar. 29, 2001

U.S. Applications:
(63) Continuation of application No. 11/960,930, filed on Dec. 20, 2007, now Pat. No. Re. 40,984.

(30) Foreign Application Priority Data

Sep. 20, 1999 (GB) ..... 9922204

(51) Int. Cl.
*H04B 17/00* (2006.01)
(52) U.S. Cl. ..... 455/67.11
(58) Field of Classification Search ..... 455/67.1
See application file for complete search history.

(56) References Cited

U.S. PATENT DOCUMENTS 5,448,750 A 9/1995 Eriksson et al.
5,491,837 A 2/1996 Haartsen et al.
5,574,974 A 11/1996 Almgren et al.
5,594,949 A 1/1997 Andersson et al.
5,666,654 A 9/1997 Kanai
5,715,240 A 2/1998 Borras et al.
5,862,124 A 1/1999 Hottinen et al.
5,915,221 A 6/1999 Sawyer et al.
5,966,657 A 10/1999 Sporre et al.
6,006,092 A 12/1999 Ward et al.
6,011,970 A 1/2000 McCarthy
6,041,235 A 3/2000 Aalto et al.
6,049,536 A 4/2000 Ariyoshi et al.
6,073,021 A 6/2000 Kumar et al.
6,094,562 A 7/2000 Zhong
6,101,383 A * 8/2000 Poon ..... 455/425
6,108,560 A 8/2000 Navaro et al.
6,134,242 A 10/2000 Aftelak
6,137,825 A 10/2000 Sekine et al.
6,144,861 A 11/2000 Sundelin et al.
6,192,244 B1 * 2/2001 Abbadessa ..... 455/436
6,219,550 B1 4/2001 Kanerva et al.

(Continued)

FOREIGN PATENT DOCUMENTS

DE 19742650 4/1999
WO WO 98/57512 12/1998

OTHER PUBLICATIONS

Examination Report on European Patent Application 00 956 753.8, dated Sep. 26, 2007.

(Continued)

*Primary Examiner* — Matthew Anderson
*Assistant Examiner* — David Bilodeau

(57) ABSTRACT

A method for reporting link information in a communication system including a communication terminal and a plurality of transceivers with each of which the communication terminal can communicate over a respective communication link; the method comprising: the communication terminal determining link information for each of the communication links; and the communication terminal periodically transmitting link messages, each link message containing link information for a first set of the communication links, and the link messages being formatted such that groups of successive link messages collectively contain link information for a larger set of the communication links.

27 Claims, 2 Drawing Sheets

U.S. PATENT DOCUMENTS

| | | | |
|---|---|---|---|
| 6,236,656 | B1 | 5/2001 | Westerberg et al. |
| 6,236,856 | B1 | 5/2001 | Abbadessa |
| 6,351,643 | B1 | 2/2002 | Haartsen et al. |
| 6,360,100 | B1 | 3/2002 | Grob et al. |
| 6,381,229 | B1 | 4/2002 | Narvinger et al. |
| 6,400,951 | B1 | 6/2002 | Vaara et al. |
| 6,480,718 | B1 | 11/2002 | Tse |
| 6,493,541 | B1 | 12/2002 | Gunnarsson et al. |
| 6,526,279 | B1 | 2/2003 | Dent |
| 6,542,742 | B2 | 4/2003 | Schramm et al. |
| 6,978,120 | B1 | 12/2005 | Melero |
| RE40,984 | E | 11/2009 | Melero |

OTHER PUBLICATIONS

International Preliminary Examination Report for PCT/IB00/01316, completed Feb. 1, 2002.
International Search Report for PCT/IB00/01316, mailed Jan. 22, 2001.
Non-Final Office Action on U.S. Appl. No. 11/305,839, mailed May 23, 2006.
Summons to Attend Oral Proceedings regarding European Patent Application 00 956 753.8, dated Jun. 9, 2010.
Written Opinion on PCT/IB00/01316, mailed Aug. 29, 2001.

* cited by examiner

Base station controller

REPORTING COMMUNICATION LINK INFORMATION

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,978,120. The reissue application numbers are Ser. No. 11/960,930 and the present application.*

*CROSS-REFERENCE TO RELATED APPLICATIONS*

*This application is a continuation of U.S. Reissue Patent Application No. 11/960,930, filed on Dec. 20, 2007 (now U.S. Pat. No. RE40984), which is a reissue application based on U.S. Pat. No. 6,978,120, issued on Dec. 20, 2005 (which claims priority to PCT International Application No. PCT/IB00/01316, filed on Sep. 5, 2000, which claims priority to British Patent Application No. 9922204, filed on Sep. 20, 1999).*

This invention relates to a method for reporting information on communication links, for example link quality information, in a telecommunications system such as a cellular radio telecommunications network.

FIG. 1 shows schematically the configuration of a typical cellular radio telecommunications network. The network comprises a number of base-stations (BSs) 1, 2, 3 etc. Each base-station has a radio transceiver capable of transmitting radio signals to and receiving radio signals from the area of a cell 4, 5, 6 etc. next to the base-station. By means of these signals the base-station can communicate with a mobile station (MS) terminal 7 in that cell, which itself includes a radio transceiver. Each base station is connected to a mobile system controller (MSC) 8, which is linked in turn to the public telephone network 9 and/or to other networks such as packet data networks. By means of this system a user of the MS 7 can establish a telephone call to the public network 9 via a BS in whose cell the MS is located.

The location of the MS could be fixed (for example if it is providing radio communications for a fixed building) or the MS could be moveable (for example if it is a hand portable transceiver or "mobile phone"). When the MS is moveable it may move between cells of the cellular radio system. As it moves from one cell (the "old cell") to another cell (the "new cell") there is a need to hand it over from communication with the BS of the old cell to the BS of the new cell without dropping the call due to a break in communications between the mobile station and the network. This process is known as handover. A need can also arise to hand over a MS whose location is fixed, for example if atmospheric conditions affect its communications with the old BS and call quality can be improved by handing it over to another BS or if there is a need to free up capacity of the old BS.

In some systems, for example the wideband code division multiple access (W-CDMA) system proposed for the Universal Mobile Telephony System (UMTS), a mobile station is capable of making traffic communications with more than one base station at one time. This macrodiversity arrangement allows greater reliability of communications and can reduce the required transmission power. It also means that handovers between one base station and another can be performed in a gradual ("soft") rather than an abrupt ("hard") way.

It is conventional for the system to include apparatus for controlling handover and macrodiversity. That apparatus could be on the network side (for example at the MSC) or the mobile side of the air interface between the MS and a BS, or could be distributed between the two. That apparatus conventionally receives information relating to the quality of potential communications between the MS and at least some of the BSs and optionally other information such as data on the load on at least some of the BSs. Using this information the apparatus determines which base station(s) an MS should communicate with and issues instructions to the BSs and the MS accordingly.

For the W-CDMA system it is proposed, in line with existing systems such as GSM, that a mobile station will transmit to the network measurement reports on communication quality with six nearby cells. For example, according to the GSM standard a report on a nearby ("neighbouring") cell will occupy 17 reserved bits in a standard reporting message of 107 bits. The reporting message can therefore contain reports on only six nearby cells. Such reporting message is to be sent by a mobile station in each multiframe—i.e. once every 480 ms.

The inventors of the present invention have identified that especially in multisystem or multiband networks and/or in cellular communication systems operating in a multilayer environment the number of cells with which the mobile station may interact might often be greater than six. It could therefore be advantageous for a mobile station to be able to transmit measurement reports for more than six cells. This would be especially advantageous in multisystem or multiband networks and/or in cellular communication systems operating in a multilayer environment. In general, multimode systems can be defined as communication environments where the mobile station may be in a service area where it can be served by more than one serving network, system, standard, frequency or the like. An example of a multiband system is a system in which a dual-band mobile station can be served by GSM (Global System for Mobile Communications) networks operating at 900 MHz and 1800 MHz. Another example is a system in which a mobile station can be served by a GSM network and a UMTS/W-CDMA network, or a GSM network and a DAMPS network.

It would thus be desirable for a mobile station to be able to report on potential communications links with more than six cells. One way in which this could be achieved is by lengthening the reporting message to give room for measurement reports on more than six cells. However, this would have major problems of incompatibility with existing systems. Another possibility would be for the level of reporting to be altered so as to occupy fewer than 17 bits. However, as well as problems of incompatibility with existing systems, this solution would be expected to reduce the reporting accuracy and therefore the precision of handover decisions.

WO 98/57512 discloses an arrangement where a measurement report is transferred to a network during the first available slow associated control channel periods. The measurement report contains data that the mobile terminal obtained while it was waiting in the idle mode. During subsequent slow associated control channel periods, the mobile terminal transfers measurement information to the network based on the data obtained in the active mode.

There is therefore a need for a practical method whereby a mobile station can transmit reporting messages on links with an increased number of cells. Such a method should preferably be capable of retaining a degree of consistency with existing standards and standardisation proposals. By this means, the method may preferably enhance multisystem, multiband and/or multimode operation. It is one aim of the present invention to at least partially address one or more of the above issues.

According to one aspect of the present invention there is provided a method for reporting link information in a communication system including a communication comprising, the communication terminal determining link information for each of the communication links, and the communication terminal periodically transmitting link messages, each link message containing link information for a first set of communication links, and the link messages being formatted in accordance with a predetermined scheme such that groups of successive link messages collectively contain link information for a set of communication links larger than the first set of communication links.

The said larger set is suitably larger than the first set of the communication links. The method preferably includes the step of defining the said larger set, for example by selecting communication links to form the said larger set.

Preferably link information for at least one of the communication links is contained in each of successive link messages. For instance, each successive link message may contain link information for one, two or more of the communication links, whilst link information for others of the communication links is not contained in every link message. That latter link information may be sent in link messages spaced apart by a set amount, for example every two or three link messages, or as determined by a less strict periodic or aperiodic scheme.

It is thus preferred that successive link messages contain link information for at least one communication link in common. It is also preferred that link messages spaced apart by a set interval—for example by one, two or three other messages—regularly contain link information for the same ones of the communication links.

The method may comprise the step of determining a subset of the communication links having the best link according to a selected measure, and wherein link information for the communication links of that subset is contained in each of successive link messages. The subset preferably consists of one communication link, or alternatively of two communication links.

It is preferred that periodically link messages contain link information for the same ones of the communication links.

The communication terminal is preferably capable of transmitting the link information in a plurality of schemes according to which link information is distributed between successive link messages. Such schemes may involve transmitting link information for a set of the communication links in alternate link messages, or in every third link message.

The communication system suitably includes a control unit (e.g. an MSC or the like) coupled to the transceivers. The method suitably comprises the step of causing at least one of the transceivers to transmit a scheme selection signal to the communication terminal indicative of the one of the plurality of schemes to be used by the communication terminal. The scheme selection signal may be transmitted on a broadcast channel. The scheme selection signal may be transmitted as part of a system information message. The method may suitably comprise the step of operating the communication terminal in response to the scheme selection signal so as to use the scheme indicated by the scheme selection signal.

The link messages may be transmitted over at least one of the said communication links. The link messages may be each sent in a respective multiframe. (The multiframe may be defined by reference to normal communications over the said communication links).

Each link message preferably contains link information for six of the communication links, and most preferably for only six of the communication links.

The link information for a communication link is preferably in some way indicative of the quality of communications over that link. The link information may, for example be indicative of received signal strength information for communications over the link—for example of the strength of received broadcast signals over the link.

The method may suitably comprise the steps of receiving the link information and making a handover decision for the communication terminal on the basis of the link information. That decision may be made at an MSC or like equipment.

The method may comprise the step of the communication terminal signalling that it is capable of operating so as to transmit successive link messages containing link information for different ones of the communication links. That signalling may be performed on establishment by the communication terminal of a connection with the system.

According to the present invention from a second aspect there is provided a communication system comprising a communication terminal, a plurality of transceivers with each of which the communication terminal can communicate over a respective communication link; a communication terminal comprising link measurement means for measuring link information for each of the communication links, transmission means for periodically transmitting link messages, each link message containing link information for a first set of communication links, link message forming means for forming the link messages in accordance with a predetermined scheme such that groups of successive link messages collectively contain link information for a set of communication links larger than the first set of communication links.

According to the present invention, third aspect there is provided a communication terminal for operation in a radio telecommunications system the terminal comprising communication means for communicating with one or more of a plurality of radio transceivers, measurement means for measuring a quality of signals received from each of the said transceivers over respective communication link, and measurement message generation means for generating measurement messages for transmission by the communication means, each measurement message containing measured quality information for a first set of the communication links, the measurement message generation means being capable of generating a series of measurement messages in accordance with a predetermined scheme, wherein groups of successive measurement messages collectively contain measured quality information for a set of communication links larger than the first set of communication links.

Optional additional features of the second and third aspects of the present invention include features analogous to those set out above in relation to the first aspect of the present invention.

The communication terminal may be a radio and/or cellular telephone. Each transceiver may be a base station transceiver of a radio telephone system. The communication system may suitably be a cellular telephone network. The communication terminal may suitably be capable of communicating by radio with one or more, and preferably all, of the transceivers.

The present invention will now be described by way of example with reference to the accompanying drawings, in which.

The present reporting method and associated apparatus will be described below with general reference to the GSM system and to the proposed UMTS/W-CDMA standard, but it will be understood that the method is analogously applicable to provide enhanced reporting in other telecommunications systems.

The present reporting method involves increasing the number of cells on which measurement reports may be sent by reducing the frequency with which reports are sent on nearby ("neighbouring") cells. Thus, successive measurement report messages may include measurement data for different sets of nearby cells. In other words, measurement reports on neighbouring cells may be transmitted with different frequencies. Such frequencies may be the same or different. In a preferred arrangement, the mobile station determines a set of neighbours providing the best links to it; measurement reports are then sent for those cells in every report message, whereas information on other links is sent less frequently—for example in every second or third report message.

To avoid ambiguity, it should be noted that the term "neighbouring" is generally used to refer to any further cell that can be reached by a mobile station in a cell of the cellular communication system, without such a cell having to actually border any cell with which the mobile station is currently communicating. Thus "neighbouring" cells will typically be wholly or partly overlapping. Neighbouring cells may be cells of another communication network or cells of another frequency. This is the case when, for example, dual-band mobile stations are used.

Figure 1:
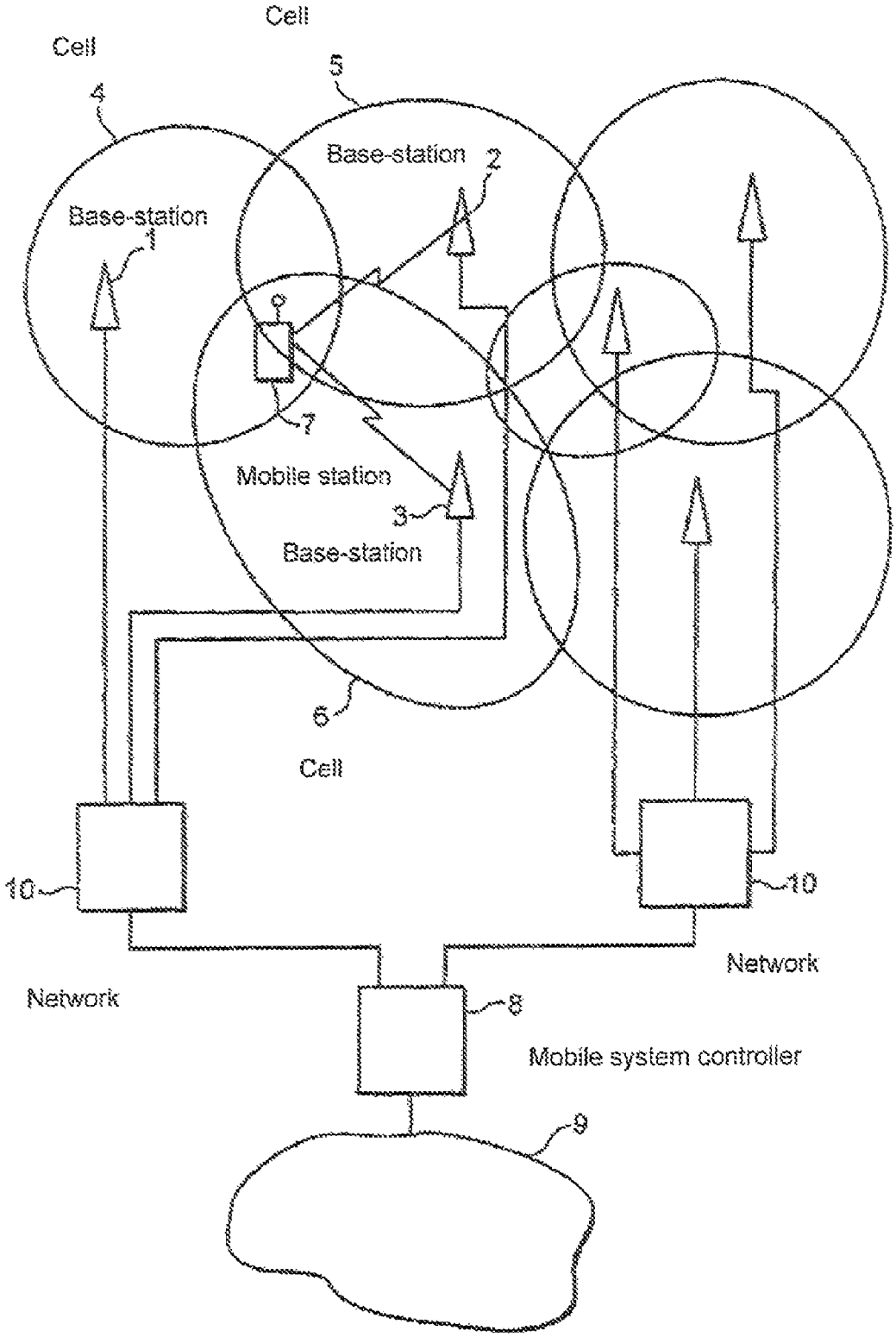
FIG. 1 shows schematically the configuration of a typical cellular radio telecommunications network.

FIG. 1 which shows a cellular network. It should be appreciated that although FIG. 1 shows base stations which each provide an omnidirectional cell, embodiments of the present invention may be implemented using any appropriate configuration of cells. It is also noted that the radio coverage area defining a cell may consist of a sector of a base station provided with a directional or sector antenna (not shown in FIG. 1). Such a sector base station may use e.g. three 120° directional antennas whereby three radio coverage areas are provided, or four 90° directional antennas providing four radio coverage areas and so on, or any combinations of different radio coverage beam widths. It should also be appreciated that base stations may sometimes be referred to as node B (e.g. in the UMTS standard). For simplicity it will be assumed herein that each cell is associated with a single base station transceiver unit (BTS).

In FIG. 1 each radio coverage area or cell is served by the respective base transceiver station BTS 1, 2, 3 etc. Each base transceiver station BTS is arranged to transmit signals to and receive signals from the mobile station MS 7 in the cell. Likewise, the mobile station is able to transmit signals to and receive signals from a respective base transceiver station. The mobile station 7 accomplishes this via wireless (preferably radio) communication with the base stations. Typically a number of mobile stations will be in communication with each base station although only one mobile station is shown in FIG. 1 for clarity.

Each of the base stations is connected to a network controller, which in one form of the exemplifying GSM system comprises a base station controller (BSC) 10 connected further to a Mobile Switching Centre (MSC) 9. In the described embodiment the MSC is used as a network controller. In some arrangements the base station controller 10 controlling one or several base stations between the network controller and the base stations may be omitted. The network controller controls its service area, i.e. the cells and base stations connected to it, either directly or via the base station controller. It is noted that typically more than one network controller is provided in a network. The network controller is connected to other elements or parts of the telecommunications network system via a suitable linking or gateway apparatus, such as Gateway Mobile Switching Centre (GMSC; not shown).

The implementation of the basic communication formatting between the mobile station, the base station and the controller in GSM and UMTS/W-CDMA systems is known, and will thus not be discussed in more detail herein. It is sufficient to note that the interface may comprise channels in both uplink and downlink directions between the mobile station in the cell associated with a given base station and that the information sent to the mobile station and the data may be sent in any suitable format. The messages sent from the mobile stations may include information identifying the mobile station (for instance, MS ID and/or IMSI (Mobile Station Identity and/or International Mobile Subscriber Identity, respectively)).

As also illustrated in FIG. 1, the mobile station can be simultaneously in the signalling or coverage area of several cells and their associated base stations. The mobile station is arranged to perform measurements in order to be able to provide information based on which a suitable cell can be selected for serving the mobile station. In other words, in addition to controlling the ongoing connection with the servicing base station, the mobile station performs measurements concerning the neighbouring cells as well. These measurements may be of any appropriate feature that is in some way indicative of the quality of potential traffic communications over the link between the mobile station and that cell; examples are signal strength of the base station for the cell as received at the mobile station, error rate of communications from that base station (e.g. bit error rate or frame error rate), or delay or distortion of such communications.

Figure 2:
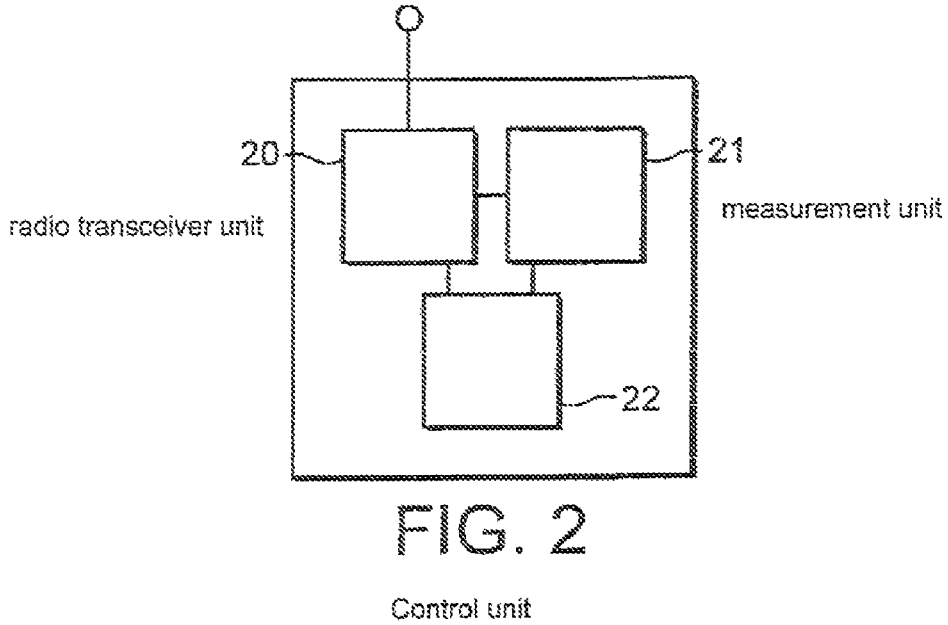
FIG. 2 shows a schematic diagram of some components of a mobile station.

FIG. 2 shows in more detail a mobile station capable of operation in the system of FIG. 1. The mobile station, which in this case is a cellular telephone, includes a radio transceiver unit 20. a measurement unit 21 and a control unit 22. These may be implemented as distinct units as illustrated in FIG. 2 or by software running on common hardware.

The transceiver 20 transmits traffic signals to and receives traffic signals from one or more base stations to which the mobile station is currently attached. The transmissions to and from the mobile station are split into multiframes, each of which occupies 480 ms. The transceiver also receives signals from other base stations, typically signals on one or more broadcast channels e.g. BCCH. These signals as well as signals received from the base station(s) to which the mobile station is attached are directed to the measurement unit 21. The measurement unit measures a feature of those signals as mentioned above—for example received signal strength. The measurement results are passed to the control unit 22 which generates measurement reports according to a scheme that will be described below. The measurement reports are then transmitted to the base station(s) to which the mobile station is attached. The measurement reports are then used by the network to make handover decisions.

The measurement reports themselves are suitably of a known format, for example of 107 bits including 17 bits per cell/base station that is being reported on.

The scheme used by the control unit may be one of a number of schemes, example schemes being described below.

Reporting Scheme 0

For reasons of backwards compatibility the control unit is capable of transmitting measurement reports in which each successive measurement report includes measurement information for communication links with the six cells determined by the control unit to be the best (e.g. being received most strongly or with fewest errors). Thus it will normally be the case that successive messages will include data relating to the same six cells.

Reporting Scheme 1

The measurement unit measures data for links with up to 10 neighbouring cells. These cells will be termed N1 to N10. The two best cells are selected by the control unit. These are, for example, the two that are received with the highest signal level. Measurement data for these cells (N1 and N2, say) is sent in every multiframe (MF)—that is every 480 ms. Measurement data for each of the remaining 8 neighbours (N3-N10) is distributed between successive multiframes so as to be sent every second multiframe—that is every 960 ms The structure of successive measurement reports under this system, with each measurement report including slots for data on measurements of six cell links, is shown in the following table:

| Measurement Report Slot Number | Multiframe n | Multiframe n + 1 | Multiframe n + 2 | ... |
|---|---|---|---|---|
| 1 | N1 | N1 | N1 | ... |
| 2 | N2 | N2 | N2 | ... |
| 3 | N3 | N4 | N3 | ... |
| 4 | N5 | N6 | N5 | ... |
| 5 | N7 | N8 | N7 | ... |
| 6 | N9 | N10 | N9 | ... |

The values reported for the neighbours N3-N10 could be an averaged value of measurements over the appropriate two multiframe period before which they are sent, so little or no information is lost. Alternatively the first, second, higher or lower value measured for each of neighbours N3-N10 over the period could be sent.

Reporting Scheme 2

The measurement unit measures data for links with up to 15 neighbouring cells. These cells will be termed N1 to N15. The best neighbour (N1) is identified and a report transmitted for it every 480 ms. The 2nd to 7th best neighbours (N2-N7) are identified and a report transmitted for each of them every 960 ms. The remaining 8 neighbours (N8-N15) are reported on every 1920 ms.

The structure of successive measurement reports under this system, with each measurement report including slots for data on measurements of six cell links, is shown in the following table:

| Measurement Report Slot Number | MF n | MF n + 1 | MF n + 2 | MF n + 3 | MF n + 4 | ... |
|---|---|---|---|---|---|---|
| 1 | N1 | N1 | N1 | N1 | N1 | ... |
| 2 | N2 | N3 | N2 | N3 | N2 | ... |
| 3 | N4 | N5 | N4 | N5 | N4 | ... |
| 4 | N6 | N7 | N6 | N7 | N6 | ... |
| 5 | N8 | N9 | N10 | N11 | N8 | ... |
| 6 | N12 | N13 | N14 | N15 | N12 | ... |

Note that the value reported for the neighbours N2-N7 could be an averaged value over the two multiframes between reports on them, and the value reported for N8-N15 could be an average over the four multiframe periods between reports on them, so little or no information may be lost. Alternatively, one of the other selection procedures described above could be used.

Reporting Scheme 3

In this scheme the control unit 22 of the mobile station ranks (e.g. on the basis of received signal level) the quality of the links with neighbouring base stations. The reporting rate for each neighbour is determined by its ranking.

In a first approach the mobile can re-evaluate the ranking of the neighbours and therefore their reporting rate each $2^{nd}$ multiframe (960 ms). In order to do so the averaged value of the signal level over the previous 2 multiframes can be used.

There would be two options to perform such averaging:

1. The mobile stores all the individual values determined over the 2 multiframes. In the worst case this would require it to store 2 received signal level (RxLev) values (of conventionally 6 bits each), for example for a maximum of, say, 15 neighbours. This would requires a total of 180 bits of memory 23 in the control unit 22 of the mobile.
2. Ongoing averaging. The averaging can be an ongoing averaging in order to minimise the required memory. If this approach is used selected the memory required in the mobile would be only 90 bits. Example:

| Multiframe | 1 | 2 |
|---|---|---|
| RxLev | 30 | 45 |
| Average | 30 | 37.5 |

Alternatively, the mobile could re-evaluate the ranking of the neighbours and therefore their reporting rate each $4^{th}$ multiframe (1920 ms). In order to do so the averaged value of the signal level over the previous 4 multiframes could be used.

In order to do so there would be two options:

1. The mobile stores all the values measured over the 4 multiframes. In the worst case this would require to store 4 RxLev values (6 bits each) for a maximum of, say, 15 neighbours. This requires a total of 45 bytes of memory in the mobile.
2. Ongoing averaging. The averaging can be an ongoing averaging in order to minimise the required memory. If this approach was selected the memory required in the mobiles would be only 90 bits. Example:

| Multiframe | 1 | 2 | 3 | 4 |
|---|---|---|---|---|
| RxLev | 30 | 45 | 33 | 60 |
| Average | 30 | 37.5 | 36 | 42 |

This scheme provides an extremely flexible way for the mobile station to send measurement information from more cells to the network.

The schemes 1 to 3 described above provide the facility to transmit measurement reports on links with neighbouring cells at different rates depending on their signal level ranking.

Figure 3:
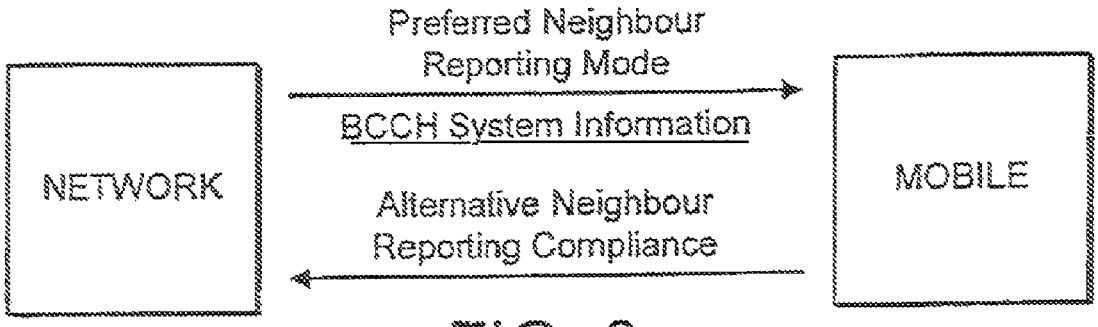
FIG. 3 illustrates signal flow in a measurement reporting arrangement.

The mobile station may automatically select an appropriate reporting scheme, or the network may indicate to the mobile station which reporting scheme is to be used. In the latter case, the indication may be by means of a scheme indication signal, which could be sent over a broadcast channel, for example the BCCH, and for example as part of the BCCH System Information message. This would allow network operators to control the introduction and operation of the enhanced reporting schemes described above. The use of two bits forming the scheme indication signal would allow the implementation of 4 different reporting modes. FIG. 3 illustrates the signal flow in such an implementation.

Preferably, mobiles that are able to offer the enhanced reporting schemes 1 to 3 described above should signal the availability of such schemes to the network. This may, for example be done each time they establish a connection to the network. At that time the mobiles supporting the above functionality may preferably inform the network that they are "alternative neighbour reporting compliant", so the network knows the available formats of neighbour reporting for a connection with those mobiles.

The selection of the relevant cells for reporting may be based on any appropriate predefined rule of selection. The rules may be defined in the standards the mobile station and/or the communication system are arranged to use. The rules may be stored permanently in the mobile station. According to one possibility the rules are stored in an appropriate network element and transmitted therefrom to the mobile station when ever required. The rules for selecting relevant cells may also be changed when this is deemed necessary. The selection of the relevant cells may be based, with no limitation to the following, on the measured signalling levels, used radio frequencies, direction of the movement of the mobile station, loading conditions of the neighbouring cells and so on.

In some of the schemes described above it is possible that resolution of neighbour cell measurement information could be lost due to the increased period between transmissions of some neighbour data. This can be mitigated or even overcome by means of pre-averaging averaging of individual measured values by the control unit 22 of the mobile station. If the mobile performs pre-averaging of the raw information that is collected by the measurement unit 21, then no information would be lost as the reported values for those neighbours with slower reporting rate will contain the averaged value of all the available information. Many networks are, in any event, configured to average the neighbour values reported by mobiles. In the system described above, since the network should know the reporting method used by each connection with a mobile and should know the reporting rate of each reported neighbour, it could apply a different averaging to each neighbour. Therefore, from a system perspective the performance of the standard and the alternate reporting methods could be enhanced, as the result after the averaging is the same, but the number of neighbours available to the system could be dramatically increased.

The period between measurement report messages is, of course, system-dependant and could be greater or less than 480 ms.

In view of the foregoing description it will be evident to a person skilled in the art that various modifications may be made within the scope of the invention as defined by the accompanying claims.

What is claimed is:

[1. A method for reporting link information in a communication system including a communication terminal and a plurality of transceivers with each of which the communication terminal can communicate over a respective communication link; the method comprising:

the communication terminal determining link information for each of the communication links; and the communication terminal periodically transmitting link message, each link message containing link information for a first set of the communication links, and the link messages being formatted such that groups of successive link messages collectively contain link information for a larger set of the communication links.]

[2. A method as claimed in claim 1, wherein link information for at least one of the communication links is contained in each of successive link messages.]

[3. A method as claimed in claimed 2, comprising the step of determining a subset of the communication links having the best link according to a selected measure, and wherein link information for the communication links of that subset is contained in each of successive link messages.]

[4. A method as claimed in claim 3, wherein the subset consists of two communication links.]

[5. A method as claimed in claim 4, wherein periodically link messages contain link information for the same ones of the communication links.]

[6. A method as claimed in claim 2, wherein the communication terminal is capable of transmitting the link information in a plurality of schemes according to which link information is distributed between successive link messages.]

[7. A method as claimed in claim 6, wherein the communication system includes a control unit coupled to the transceivers, and the method comprises the step of causing at least one of the transceivers to transmit a scheme selection signal to the communication terminal indicative of the one of the plurality of schemes to be used by the communication terminal.]

[8. A method as claimed in claim 7, wherein the scheme selection signal is transmitted on a broadcast channel.]

[9. A method as claimed in claim 7, wherein the scheme selection signal is transmitted as part of a system information message.]

[10. A method as claimed in claim 7, comprising the step of operating the communication terminal in response to the scheme selection signal so as to use the scheme indicated by the scheme selection signal.]

[11. A method as claimed in claim 7, wherein one of the schemes involves transmitting link information for a set of the communication links in alternate link messages.]

[12. A method as claimed in claim 7, wherein one of the schemes involves transmitting link information for a set of the communication links in every third link message.]

[13. A method as claimed in claim 12, wherein the link messages are transmitted over at least one of the said communication links.]

[14. A method as claimed in claim 13, wherein each link message is sent in a respective multiframe of communications over the said communication links.]

[15. A method as claimed in claim 14, wherein each link message contains link information of six of the communication links.]

[16. A method as claimed in claim 15, wherein the link information for a communication link is indicative of the quality of communications over that link.]

[17. A method as claimed in claim 16, comprising the steps of receiving the link information and making a handover decision for the communication terminal on the basis of the link information.]

[18. A method as claimed in claim 17, comprising the step of the communication terminal signaling that it is capable of operating so as to transmit successive link messages containing link information for different ones of the communication links.]

[19. A method as claimed in claim 18, wherein the step of the communication terminal signaling that is capable of operating so as to transmit successive link messages containing link information for different ones of the communication links is performed on establishments by the communication terminal of a connection with the system.]

[20. A method as claimed in claim 19, wherein the communication terminal is a radio telephone.]

[21. A method as claimed in claim 20, wherein each transceiver is a base station transceiver of a radio telephone system.]

[22. A communication system comprising:

a communication terminal;

a plurality of transceivers with each of which the communication terminal can communicate over a respective communication link;

the communication terminal comprising link measurement means for measuring link information for each of the communication links; transmission means for periodically transmitting link messages, each link message containing link information for a first set of the communication links; and link message forming means for forming the link messages such that groups of successive link messages collectively contain link information for a larger set of the communication links.]

[23. A communication terminal for operation in a radio telecommunications system, the terminal comprising:

communication means for communicating with one or more of a plurality of radio transceivers;

measurement means for measuring a quality of signals received from each of the said transceivers over a respective communication link; and measurement message generation means for generating measurement messages for transmission by the communication means, each measurement message containing measured quality information for a first set of the communication links; the measurement message generation means being capable of generating a series of measurements messages wherein groups of successive measurement messages collectively contain measured quality information for a larger set of the communication links.]

[24. A control unit for operating in a communication system, the communication system including a communication terminal and a plurality of transceivers with each of which the communication terminal can communicate over a respective communication link, the communication system being arranged to perform a method of reporting link information comprising:

the communication terminal determining link information for each of the communication links; and the communication terminal periodically transmitting link messages, each link message containing link information for a first set of the communication links, and the link messages being formatted in accordance with a predetermined scheme such that groups of successive link messages collectively contain link information for a set of communication links larger than the first set of communication links;

the control unit being coupled to the transceivers and being arranged to cause at least one of the transceivers to transmit a scheme selection signal to the communication terminal indicative of the one of the plurality of schemes to be used by the communication terminal.]

*25. A method for reporting link information in a communication system including a communication terminal and a plurality of transceivers each capable of communicating with the communication terminal over a respective communication link, the method comprising:*

*the communication terminal determining a first subset of transceivers from the plurality of transceivers such that the communication links for the transceivers in the first subset are better according to a predetermined measure than the communication links for the transceivers not in the first subset and where the total number of transceivers in the first subset is a first predetermined number;*

*the communication terminal determining a second subset of transceivers from the plurality of transceivers such that the total number of transceivers in the second subset is a second predetermined number and such that the first subset and the second subset have no transceivers in common;*

*the communication terminal determining a third subset of transceivers from the plurality of transceivers such that the total number of transceivers in the third subset is the second predetermined number, such that the first subset and the third subset have no transceivers in common, and such that the second subset contains at least one transceiver that is not in the third subset;*

*the communication terminal transmitting a first link message containing link information about each communication link corresponding to a transceiver in the first subset and containing link information about each communication link corresponding to a transceiver in the second subset; and*

*the communication terminal transmitting a second link message containing link information about each communication link corresponding to a transceiver in the first subset and containing link information about each communication link corresponding to a transceiver in the third subset, and wherein the link information in the second link message for a communication link corresponding to a transceiver in the third subset includes an average of two or more link measurements.*

*26. The method of claim 25, wherein the sum of the first predetermined number and the second predetermined number is six.*

*27. The method of claim 26, wherein the first predetermined number is four.*

*28. The method of claim 25, wherein the predetermined measure is received signal strength.*

*29. The method of claim 25, wherein the predetermined measure is bit error rate.*

*30. The method of claim 25, wherein the predetermined measure is frame error rate.*

*31. The method of claim 25, wherein the average of two or more link measurements is an average of two link measurements.*

*32. The method of claim 25, wherein the average of two or more link measurements is an average of more than two link measurements.*

*33. A method for reporting link information in a communication system including a communication terminal and a plurality of transceivers each capable of communicating with the communication terminal over a respective communication link, the method comprising:*

*measuring link information, at a particular one of the plurality of transceivers, for a plurality of communication links such that the measured link information includes a first number of measurements of a first communication link and a second number of measurements of a second communication link; and*

*transmitting, by the particular one of the plurality of transceivers, a number of link messages equal to the first number such that each link message from the number of link messages includes only one of the first number of measurements, such that all of the first number of measurements are transmitted in the link messages, and such that only one link message from the number of link*

*messages includes the average of the second number of measurements, wherein the link message that includes the average of the second number of measurements also includes at least one of the first number of measurements, wherein the first number is greater than the second number, wherein the second number is greater than or equal to two.*

*34. The method of claim 33 wherein the first number is four.*

*35. The method of claim 33 wherein the second number is two.*

*36. The method of claim 33 wherein the first number is four and the second number is two.*

*37. The method of claim 33 wherein each measurement of the first communication link is better according to a predetermined measure than each measurement of the second communication link.*

*38. The method of claim 37, wherein the predetermined measure is received signal strength.*

*39. The method of claim 37, wherein the predetermined measure is bit error rate.*

*40. The method of claim 37, wherein the predetermined measure is frame error rate.*

*41. A communication terminal for operation in a communication system that includes a plurality of transceivers each capable of communicating with the communication terminal over a respective communication link, comprising:*

*a measurement unit configured to measure link information for a plurality of communication links such that the measured link information includes a first number of measurements of a first communication link and a second number of measurements of a second communication link;*

*a control unit configured to receive the measured link information from the measurement unit and generate a measurement report including only one measurement chosen from the first number of measurements and including the average of the second number of measurements; and*

*a transmitter configured to transmit the measurement report to a base station;*

*wherein the first number is greater than the second number, and wherein the second number is greater than or equal to two.*

*42. The communication terminal of claim 41, wherein the second number is two.*

*43. The communication terminal of claim 41, wherein each measurement in the first number of measurements is better than each measurement in the second number of measurements according to a predetermined measure.*

*44. The communication terminal of claim 43, wherein the predetermined measure is received signal strength.*

*45. A communication terminal for operation in a communication system that includes a plurality of transceivers each capable of communicating with the communication terminal over a respective communication link, comprising:*

*a measurement means for measuring link information for a plurality of communication links such that the measured link information includes a first number of measurements of a first communication link and a second number of measurements of a second communication link;*

*a control means for receiving the measured link information from the measurement unit and generating a measurement report including only one measurement chosen from the first number of measurements and including the average of the second number of measurements; and*

*a transmitter means for transmitting the measurement report to a base station, wherein the first number is greater than the second number, and wherein the second number is greater than or equal to two.*

*46. The communication terminal of claim 45, wherein the second number is two.*

*47. The communication terminal of claim 45, wherein each measurement in the first number of measurements is better than each measurement in the second number of measurements according to a predetermined measure.*

*48. The communication terminal of claim 47, wherein the predetermined measure is received signal strength.*

*49. A non-transitory computer-readable medium storing computer-executable instructions, the instructions comprising:*

*instructions to determine a first subset of transceivers from a plurality of transceivers such that communication links for the transceivers in the first subset are better according to a predetermined measure than communication links for the transceivers not in the first subset, and wherein the total number of transceivers in the first subset is a first predetermined number;*

*instructions to determine a second subset of transceivers from the plurality of transceivers such that a total number of transceivers in the second subset is a second predetermined number and such that the first subset and the second subset have no transceivers in common;*

*instructions to determine a third subset of transceivers from the plurality of transceivers such that a total number of transceivers in the third subset is the second predetermined number, such that the first subset and the third subset have no transceivers in common, and such that the second subset contains at least one transceiver that is not in the third subset;*

*instructions to transmit a first link message containing link information about each communication link corresponding to a transceiver in the first subset and containing link information about each communication link corresponding to a transceiver in the second subset; and*

*instructions to transmit a second link message containing link information about each communication link corresponding to a transceiver in the first subset and containing link information about each communication link corresponding to a transceiver in the third subset, and wherein the link information in the second link message for a communication link corresponding to a transceiver in the third subset includes an average of two or more link measurements.*

*50. A non-transitory computer-readable medium storing computer-executable instructions, the instructions comprising:*

*instructions to measure link information for a plurality of communication links such that the measured link information includes a first number of measurements of a first communication link and a second number of measurements of a second communication link; and*

*instructions to transmit a number of link messages equal to the first number such that each link message from the number of link messages includes only one of the first number of measurements, such that all of the first number of measurements are transmitted in the link messages, and such that only one link message from the number of link messages includes the average of the second number of measurements, wherein the link message that includes the average of the second number of measurements also includes at least one of the first number of measurements, wherein the first number is greater than the second number, and wherein the second number is greater than or equal to two.*

*51. The communication terminal of claim 41, further comprising ranking a signal level of each of the plurality of communication links, and selecting the first and second communication links from the plurality of communication links based on the ranking of their respective signal levels, wherein the first communication link has a higher signal level ranking than the second communication link.*

* * * * *

UNITED STATES PATENT AND TRADEMARK OFFICE

CERTIFICATE OF CORRECTION

PATENT NO. : RE44,020 E
APPLICATION NO. : 12/619509
DATED : February 19, 2013
INVENTOR(S) : Juan Melero It is certified that error appears in the above-identified patent and that said Letters Patent is hereby corrected as shown below:

On the Title Page, Item (75), under "Inventor", in Column 1, Line 1, delete "Malaga" and insert -- Málaga --, therefor.

In the Specification:

In Column 7, Line 19, delete "ms" and insert -- ms. --, therefor.

In the Claims:

In Column 10, Line 7, in Claim 3, delete "claimed in claimed" and insert -- claimed in claim --, therefor.

In Column 13, Line 8, in Claim 34, delete "33" and insert -- 33, --, therefor.

In Column 13, Line 9, in Claim 35, delete "33" and insert -- 33, --, therefor.

In Column 13, Line 11, in Claim 36, delete "33" and insert -- 33, --, therefor.

In Column 13, Line 13, in Claim 37, delete "33" and insert -- 33, --, therefor.

Signed and Sealed this
Twentieth Day of May, 2014

Michelle K. Lee

Michelle K. Lee
*Deputy Director of the United States Patent and Trademark Office*